G. M. CONOVER.
DEVICE FOR PREVENTING BACK-MOTION OF SEWING-MACHINES.
No. 191,316. Patented May 29, 1877.
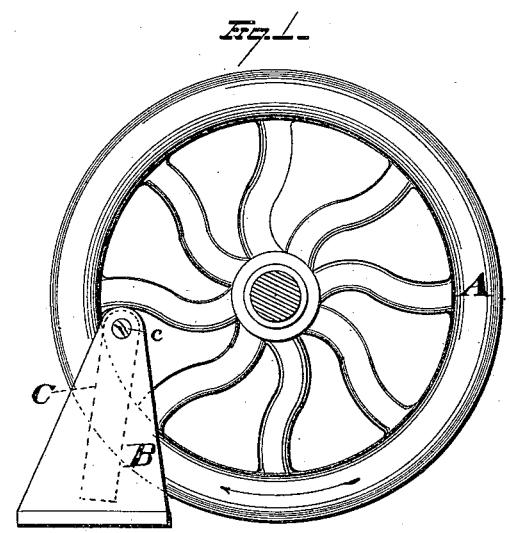
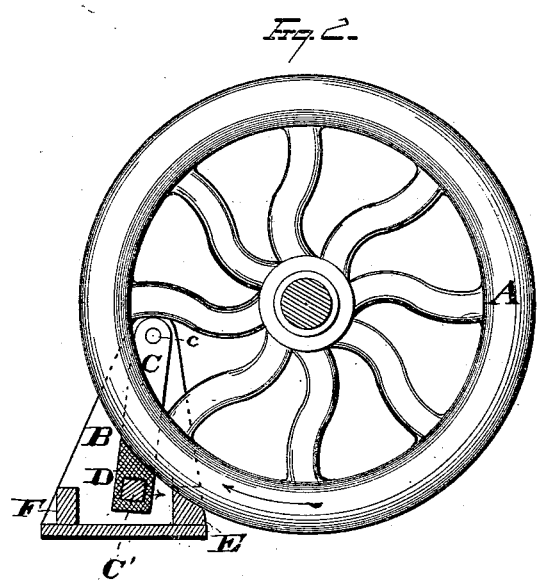 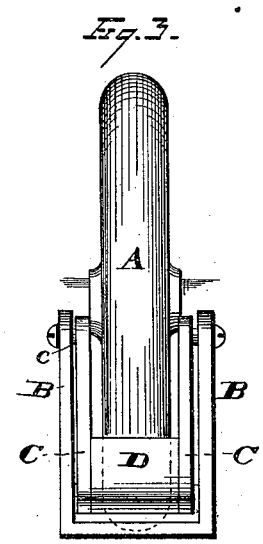
WITNESSES
INVENTOR
ATTORNEYS

UNITED STATES PATENT OFFICE.

GEORGE M. CONOVER, OF CLEVELAND, OHIO, ASSIGNOR OF ONE-HALF HIS RIGHT TO GEORGE R. TUTTLE, OF SAME PLACE.

IMPROVEMENT IN DEVICES FOR PREVENTING BACK MOTION OF SEWING-MACHINES.

Specification forming part of Letters Patent No. 191,316, dated May 29, 1877; application filed May 2, 1877.

*To all whom it may concern:*

Be it known that I, GEORGE M. CONOVER, of Cleveland, in the county of Cuyahoga and State of Ohio, have invented certain new and useful Improvements in Device for Preventing Back Motion of Sewing-Machines; and I do hereby declare the following to be a full, clear, and exact description of the invention, such as will enable others skilled in the art to which it pertains to make and use it, reference being had to the accompanying drawings, which form part of this specification.

My invention relates to a new and useful improvement in devices for preventing the back motion of a sewing-machine; and consists in the combination of devices and appliances as hereinafter set forth and claimed.

In the drawing, Figure 1 is a side view of a sewing-machine drive-wheel with my improvement. Fig. 2 is a longitudinal section exhibiting my invention. Fig. 3 is a side and end view of my device.

A is the drive-wheel or other wheel of a sewing-machine, or other suitable mechanism, wherein the motion of the wheel is always desired to be in one direction, and where all motion in the other direction should be prevented. B is a suitable support, and C a frame, pivoted at c to the said support. The frame C has two upright arms and a cross-piece, C', at the bottom. The sewing-machine wheel revolves between these two upright arms or suspenders. D is a piece of rubber, or its equivalent, secured to the cross-piece, and preferably made to embrace the same, so that there may be no danger of its coming loose.

The motion of the wheel A is in the direction of the arrow, and the swinging-frame support C is so adjusted with relation to the wheel that the wheel shall impinge slightly against the rubber as the wheel revolves; but should the wheel be turned in the other direction the tendency of the wheel is to draw the rubber beneath it, causing the rubber to impinge strongly against the wheel.

E is a stop, so located that when the wheel has attained a firm bite upon the rubber the further motion of the swinging arm is checked by coming against the stop E. F is another bar or cross-piece, designed simply to prevent the wheel, when revolving in its proper direction, from throwing the swinging frame away from it too far.

What I claim is—

The combination, with the fly-wheel of a sewing-machine, of a swinging frame having a friction-pad secured thereto, and a guard and a stop secured relatively to the swinging frame, in the manner described, and thereby serving to limit the movement of the pad in either direction, substantially as described.

In testimony whereof I have signed my name to this specification in the presence of two subscribing witnesses.

GEORGE M. CONOVER.

Witnesses:
 FRANCIS TOUMEY,
 W. E. DONNELLY.